US009098363B2

(12) United States Patent
Schmidt et al.

(10) Patent No.: US 9,098,363 B2
(45) Date of Patent: Aug. 4, 2015

(54) SEARCH EXTENSIBILITY TO THIRD PARTY APPLICATIONS

(75) Inventors: Edward T. Schmidt, San Francisco, CA (US); Gordon J. Freedman, Palo Alto, CA (US); Benjamin S. Phipps, San Francisco, CA (US); David Rahardja, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 12/829,209

(22) Filed: Jul. 1, 2010

(65) Prior Publication Data

US 2011/0252038 A1    Oct. 13, 2011

Related U.S. Application Data

(60) Provisional application No. 61/321,764, filed on Apr. 7, 2010.

(51) Int. Cl.
*G06F 17/30* (2006.01)
*G06F 9/445* (2006.01)

(52) U.S. Cl.
CPC ............ *G06F 8/60* (2013.01); *G06F 17/30943* (2013.01)

(58) Field of Classification Search
CPC .............. G06F 17/30613; G06F 17/30997; G06F 17/30106; G06F 17/30943
See application file for complete search history.

(56) References Cited

U.S. PATENT DOCUMENTS

| 6,338,056 | B1 | 1/2002 | Dessloch et al. |
| 7,448,042 | B1* | 11/2008 | Engber et al. ................. 719/313 |
| 2005/0091658 | A1* | 4/2005 | Kavalam et al. .............. 718/104 |
| 2005/0203893 | A1* | 9/2005 | Bourdoncle et al. ............. 707/3 |
| 2007/0033172 | A1* | 2/2007 | Williams et al. .................. 707/3 |
| 2008/0091448 | A1 | 4/2008 | Niheu et al. |
| 2009/0119280 | A1 | 5/2009 | Waters et al. |
| 2009/0276405 | A1 | 11/2009 | Weissman et al. |

FOREIGN PATENT DOCUMENTS

| EP | 0994415 A2 | 4/2000 |
| EP | 0994415 A3 | 4/2000 |
| EP | 1650676 A1 | 4/2006 |
| WO | WO 2007/048702 A2 | 5/2007 |

OTHER PUBLICATIONS

Author:Robert A. Joyce, Judson Powers, Frank Adelstein; Title: Mac Marshal™: A Tool for Mac OS X OperatingSystem and Application Forensics; Date: Apr. 3, 2009; Publisher: Cyber Security Technologies Corporation; Pertinent pp. 1-10 (whole pdf as attached).*

(Continued)

*Primary Examiner* — Anh Tai Tran
(74) *Attorney, Agent, or Firm* — Blakely, Sokoloff, Taylor & Zafman LLP

(57) ABSTRACT

At least certain embodiments of the present disclosure include a method to extend search capabilities to third party applications installed on a device. In one embodiment, records associated with a third party application are indexed in a process isolated from other third party applications installed on the device using a search plugin specific to the third party application. Furthermore, the indexed records can be searched in response to a user search query without invoking the third party application.

15 Claims, 12 Drawing Sheets

(56) References Cited

OTHER PUBLICATIONS

PCT International Search Report and Written Opinion (dated Dec. 6, 2010), International Application No. PCT/US2010/050075, International Filing Date—Sep. 23, 2010, (13 pages).

PCT International Preliminary Report on Patentability, and Written Opinion of the Searching Authority for PCT/US2010/050075, mailed on Oct. 18, 2012, (9 pages).

* cited by examiner

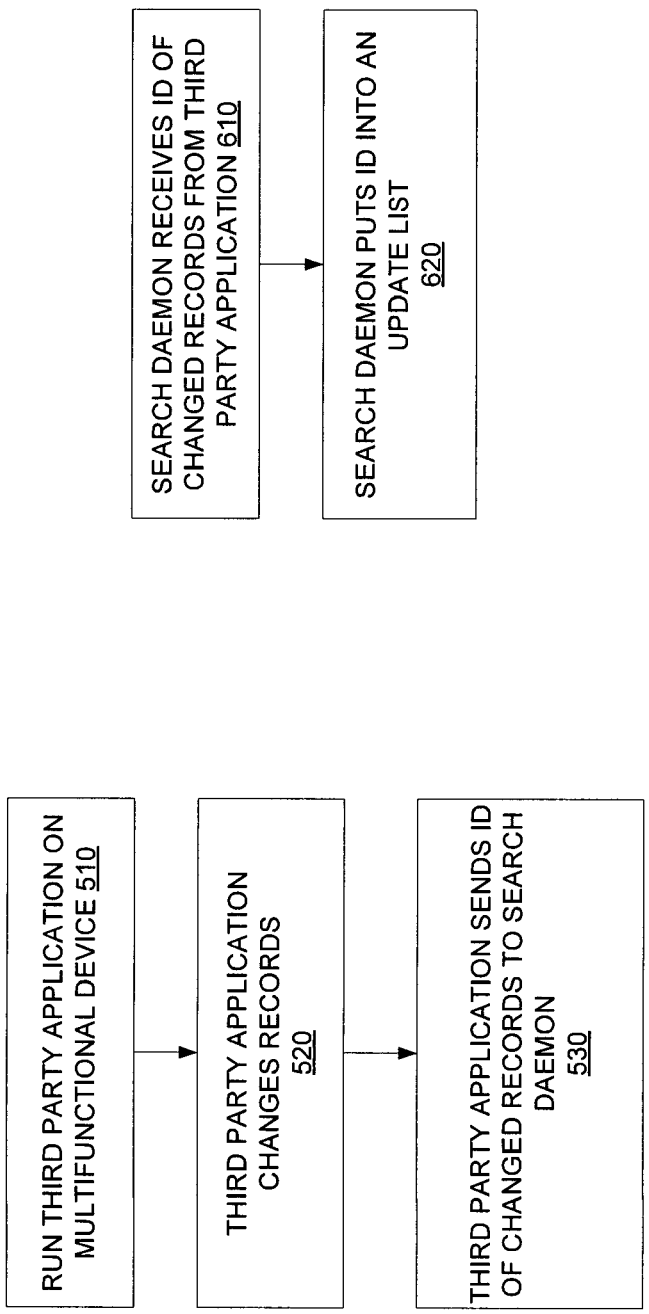

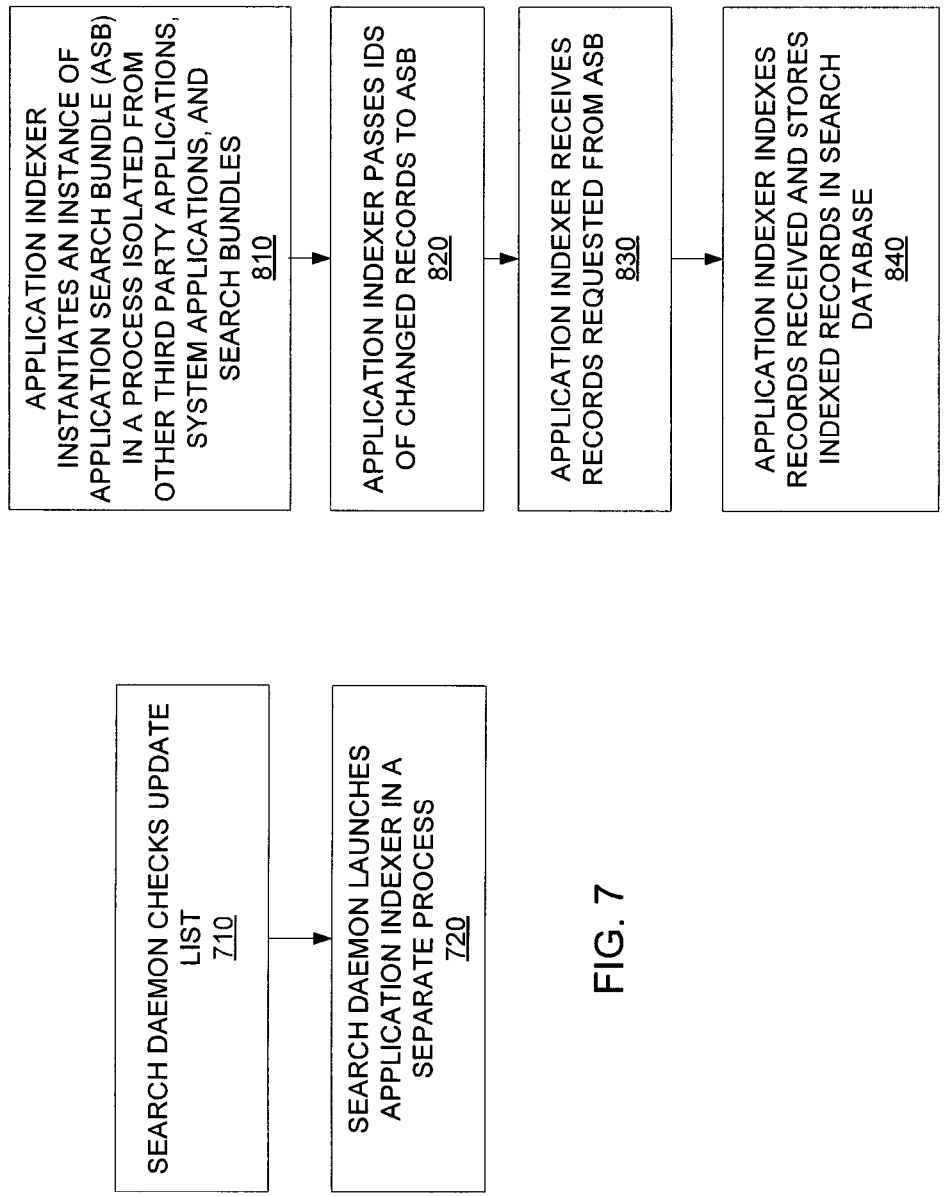

| ID 1100 | | | | |
|---|---|---|---|---|
| TITLE 1110 | SUB-TITLE 1120 | OWNING APPLICATION 1130 | CATEGORY IDENTIFIER 1140 | APPLICATION-SPECIFIC IDENTIFIER 1150 |

FIG. 11

SEARCH EXTENSIBILITY TO THIRD PARTY APPLICATIONS

RELATED APPLICATIONS

This application claims the benefit of U.S. Provisional Patent Application No. 61/321,764, filed on Apr. 7, 2010, which is herein incorporated by reference in its entirety.

FIELD OF THE DISCLOSURE

This disclosure relates to extending search capabilities to third party applications on a computing device.

BACKGROUND OF THE DISCLOSURE

Today, many applications have been developed for running on multifunctional devices, such as cellular telephones that include media players, personal digital assistants (PDAs), etc. Many of these applications are provided by sources other than the vendor of the multifunctional devices, and hence, they are commonly referred to as third party applications. These applications may perform a wide variety of functions, such as providing entertainment, social networking, etc. In performing these functions, the multifunctional devices may access contents stored in the multifunctional devices or over a network (e.g., the Internet).

To make it easier and more convenient for users of the multifunctional devices to organize and manage contents on the multifunctional devices, operating systems installed on the multifunctional devices typically provide searching capabilities. Because many of the applications installed on the multifunctional devices are third party applications, conventional operating systems installed in the multifunctional devices do not extend their search capabilities to these third party applications.

SUMMARY OF THE DESCRIPTION

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

At least certain embodiments of the present disclosure include one or more APIs in an environment with search capabilities extended to one or more third party applications on a multifunctional device. Various function calls or messages are transferred via the APIs between the operating system of the multifunctional device and third party applications. Example APIs transfer function calls to implement indexing and searching of contents associated with the third party applications.

Some embodiments of the present disclosure include a method for extending search capabilities to third party applications installed on a multifunctional device. In one embodiment, records associated with a third party application are indexed in a process isolated from other third party applications, system applications, and search bundles installed on the multifunctional device using a search plugin specific to the third party application. Note that the indexing may be performed without invoking the third party application. Furthermore, the indexed records can be searched in response to a user search query without invoking (e.g., launching or running) the third party application.

According to some embodiments of the present disclosure, a third party application installed on a multifunctional device can provide a search plugin specific to the third party application. The search plugin can be launched to pass records associated with the third party application to a search daemon running in a separate process on the multifunctional device. Identifiers (IDs) of the records can specify how a record should look like when the record is displayed in a search result generated in response to a user search query. Each of the IDs may further include a local ID, which has sub-IDs corresponding to different types of contents within a document associated with the respective record.

Various devices which perform one or more of the foregoing methods and machine-readable media which, when executed by a processing system, cause the processing system to perform these methods, are also described.

Other methods, devices and machine-readable media are also described.

BRIEF DESCRIPTION OF THE DRAWINGS

The disclosure is described by way of example with reference to the accompanying drawings, wherein:

FIG. 5 is a flow chart of one embodiment of a method for a third party application on a multifunctional device to process changes in application data;

FIG. 6 is a flow chart of one embodiment of a method for a search daemon on a multifunctional device to process changes in application data associated with a third party application;

FIG. 7 is a flow chart of one embodiment of a method for a search daemon on a multifunctional device to index application data;

FIG. 8 is a flow chart of one embodiment of a method for an application indexer on a multifunctional device to index application data;

FIG. 11 illustrates one embodiment of a local identifier of an exemplary document;

DETAILED DESCRIPTION

Figure 1:
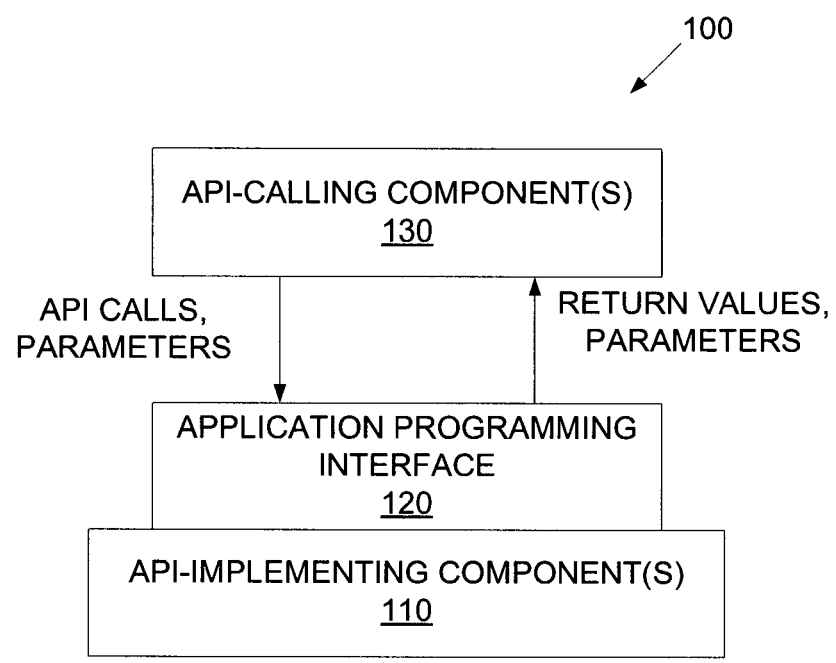
FIG. 1 illustrates a block diagram of an exemplary API architecture usable in some embodiments of the invention.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosure.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.).

At least certain embodiments of the present disclosure include one or application programming interfaces in an environment with search software interacting with a software application. Various function calls or messages are transferred via the application programming interfaces between the search software and software applications. Transferring the function calls or messages may include issuing, initiating, invoking or receiving the function calls or messages. Example application programming interfaces transfer function calls to implement various operations (e.g., search, networking, service discovery, etc.) for a device having a display region. An API may also implement functions having parameters, variables, or pointers. An API may receive parameters as disclosed or other combinations of parameters. In addition to the APIs disclosed, other APIs individually or in combination can perform similar functionality as the disclosed APIs.

The display region may be in a form of a window. A window is a display region which may or may not have a border and may be the entire display region or area of a display. In some embodiments, a display region may have at least one window and/or at least one view (e.g., web, text, or image content). The methods, systems, and apparatuses disclosed can be implemented with display regions, windows, and/or views.

At least certain embodiments of the disclosure may be part of a portable electronic device, such as a digital media player (e.g., a portable music and/or video media player), which may include a media processing system to present the media, a storage device to store the media and may further include a radio frequency (RF) transceiver (e.g., an RF transceiver for a cellular telephone) coupled with an antenna system and the media processing system. In certain embodiments, data stored on a remote storage device may be transmitted to the portable electronic device through the RF transceiver. The data may be, for example, one or more of music or other audio, still pictures, or motion pictures, etc.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). In some embodiments, the display device and input device are integrated while in other embodiments the display device and input device are separate devices.

Embodiments of the disclosure described herein may be part of other types of data processing systems, such as, for example, entertainment systems or personal digital assistants (PDAs), or general purpose computer systems, or special purpose computer systems, or an embedded device within another device, or cellular telephones which do not include media players, or multifunctional touch tablet devices, or other multifunctional touch devices, or devices which combine aspects or functions of these devices (e.g., a media player, such as an iPod® portable media player, combined with a PDA, an entertainment system, and a cellular telephone in one device, an iPhone®). Because these devices generally have multiple functionalities, these devices may also be referred to as multifunctional devices hereinafter. In this disclosure, electronic devices and consumer devices are types of devices.

In some embodiments, a platform provides various search, service discovery, and networking operations. The platform includes hardware components and an operating system. The hardware components may include a processing unit coupled to an input panel and a memory coupled to the processor. The operating system includes one or more programs that are stored in the memory and configured to be executed by the processing unit. One or more programs include various instructions for transferring function calls or messages through an Application Programming Interface (API) in order to perform various search, service discovery, and networking operations.

One or more APIs may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API, and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

FIG. 1 is a block diagram illustrating an exemplary API architecture, which may be used in some embodiments of the invention. As shown in FIG. 1, the API architecture 100 includes the API-implementing component 110 (e.g., an operating system, a library, a device driver, an API, an application program, software or other module) that implements the API 120. The API 120 specifies one or more functions, methods, classes, objects, protocols, data structures, formats and/or other features of the API-implementing component that may be used by the API-calling component 130. The API 120 can specify at least one calling convention that specifies how a function in the API-implementing component receives parameters from the API-calling component and how the function returns a result to the API-calling component. The API-calling component 130 (e.g., an operating system, a library, a device driver, an API, an application program, software or other module) makes API calls through the API 120 to access and use the features of the API-implementing component 110 that are specified by the API 120. The API-implementing component 110 may return a value through the API 120 to the API-calling component 130 in response to an API call.

It will be appreciated that the API-implementing component 110 may include additional functions, methods, classes, data structures, and/or other features that are not specified through the API 120 and are not available to the API-calling component 130. It should be understood that the API-calling component 130 may be on the same system as the API-implementing component 110 or may be located remotely and accesses the API-implementing component 110 using the API 120 over a network. While FIG. 1 illustrates a single API-calling component 130 interacting with the API 120, it should be understood that other API-calling components, which may be written in different languages (or the same language) than the API-calling component 130, may use the API 120.

The API-implementing component 110, the API 120, and the API-calling component 130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 2:
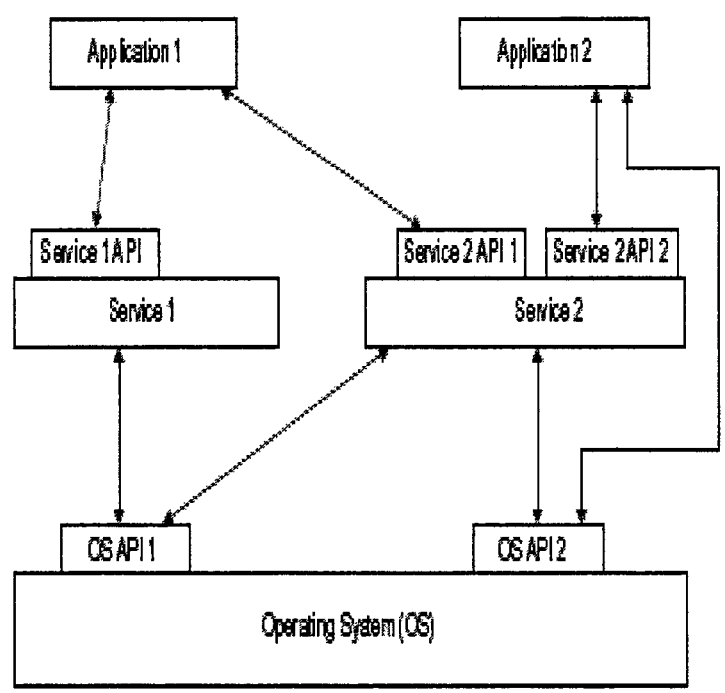
FIG. 2 is an exemplary embodiment of a software stack usable in some embodiments of the invention.

In FIG. 2 ("Software Stack"), an exemplary embodiment, applications can make calls to Services 1 or 2 using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 3:
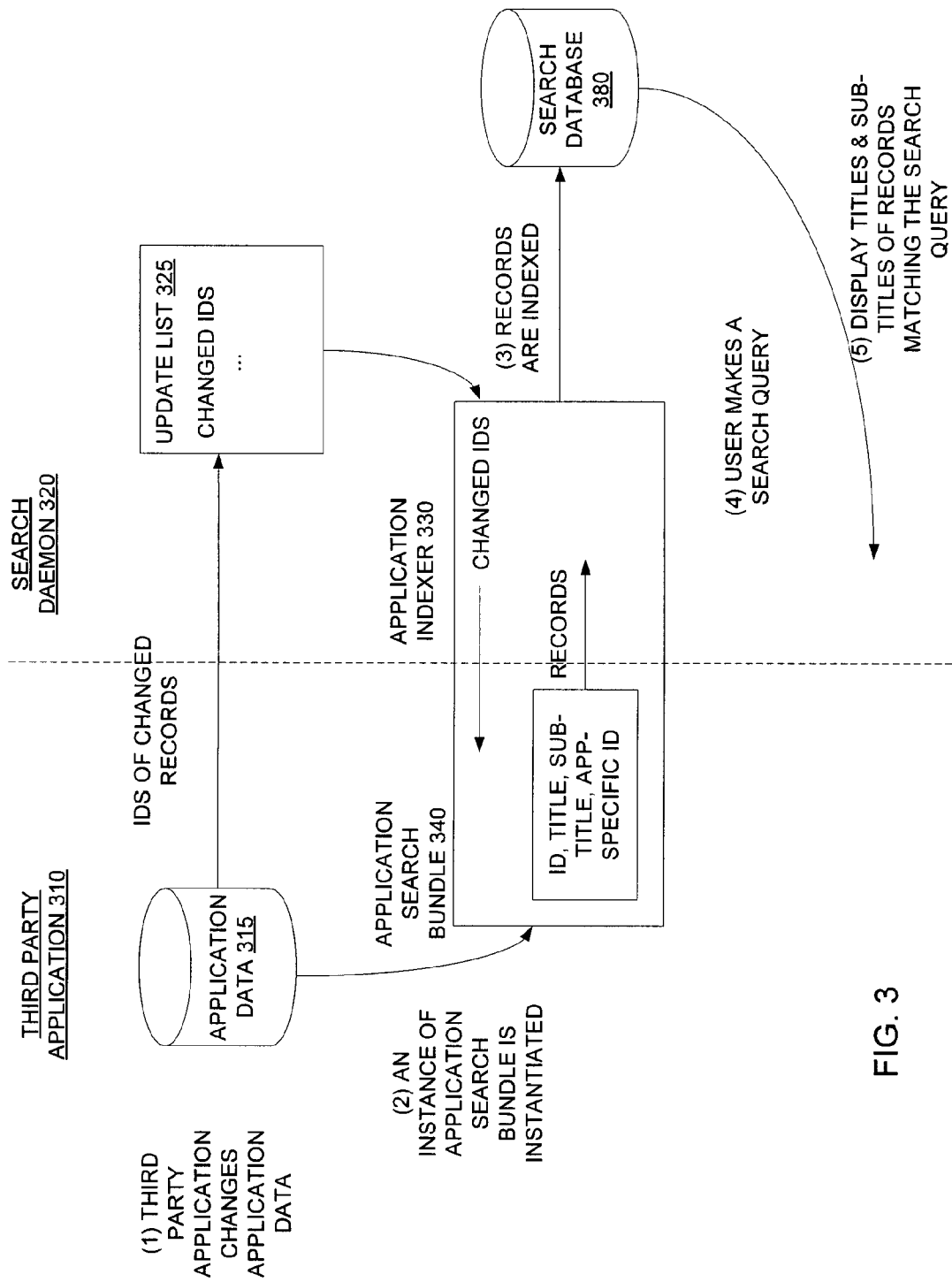
FIG. 3 is a diagram of interactions between a search daemon and a third party application running on a multifunctional device according to one embodiment of the invention.

FIG. 3 is a diagram of interactions between a search daemon 320 and a third party application 310 running on a multifunctional device according to one embodiment of the invention. A third party application as used herein broadly refers to a software application provided by an entity other than the maker of the multifunctional device. Typically, a user of the multifunctional device may install one or more third party applications executable on the multifunctional device to perform a specific set of tasks or functions. Some examples of third party applications include electronic book viewer, social network manager, etc.

In general, the multifunctional device may store application data associated with third party application 310 indexed by search daemon 320 in a search database 380 on the multifunctional device. In one embodiment, the device can have a plurality of third party applications, such as application 310, each working within the manner described herein, the search daemon 320 or an instance of search daemon 320 created for a corresponding third party application that uses the instance. In some embodiments, search daemon 320 may launch an application indexer 330 to index application data. Specifically, application indexer 330 may launch an instance of an application search bundle 340 provided by third party application 310 to retrieve records of application data for indexing. Note that application search bundle 340 is launched in a separate process isolated from other third party applications, system applications, and search bundles for security reasons. Furthermore, the separate process in which application search bundle 340 is launched may have the same privileges (e.g., privileges with respect to reading and writing into a selected portion of a memory space but otherwise restricted from writing or reading other portions of the memory) as third party application 310 associated with application search bundle 340. Thus, application search bundle 340 is granted access to contents which third party application 310 is allowed to access, and is prohibited from accessing contents which third party application 310 is not allowed to access. In some embodiments, portions of the search daemon 320, such as application indexer 330, can also be given the same privileges (e.g., memory space restrictions) as third party application 310. In some embodiments, search daemon 320 may search the indexed application data in search database 380 in response to user queries without launching third party application 310. Details of some embodiments of the interactions between search daemon 320 and third party application 310 to index and search application data are discussed below to further illustrate the above concept.

In one embodiment, third party application 310 is launched to run on the multifunctional device. While running, third party application 310 makes changes to application data 315. For example, third party application 310 may modify an existing record stored on the multifunctional device, download a new record to the multifunctional device, and/or remove (or delete) an existing record stored on the multifunctional device. When third party application 310 changes application data 315, third party application 310 further sends identifiers (IDs) of records changed in application data 315 to search daemon 320. Search daemon 320 may temporarily store the IDs of changed records in an update list 325.

Later, when search daemon 320 needs to construct indexed data, search daemon 320 may launch a separate process to run application indexer 330. Search daemon 320 may construct indexed data periodically, or when a search is requested, or at some other time or intervals of time. Alternatively, search daemon 320 may construct indexed data when the search daemon 320 discovers new information in update list 325. This can happen at the time third party application 310 informs search daemon 320 of the update identifiers. There also may be triggers external to application 310 that may start indexing, such as, for example, application updates, system restores, system updates, etc. Application indexer 330 may load application search bundle 340. In some embodiments, application search bundle 340 is a search related plugin specific to third party application 310. Third party application 310 may have provided application search bundle 340 upon installation of third party application 310 onto the multifunctional device. Application indexer 330 may provide the IDs of changed records from update list 325 to application search bundle 340. In response, application search bundle 340 provides the changed records to application indexer 330 to be indexed. Alternatively, application indexer 330 may request all records associated with third party application 310 from application search bundle 340. In one embodiment, the instance of the application indexer 330 for third party application 310 is run in its own process but with the privileges (with respect to memory control, memory space, memory allocation, filesystem control, and network control) as third party application 310.

In some embodiments, each record includes a set of attributes dictating how the respective record should be displayed in a search result in the event of being matched to a user search query. For example, an exemplary record may include an ID, a title of the content, a sub-title of the content, and an application-specific ID (also referred to as a local ID). When the record matches a user search query, the title and the sub-title of the record may be presented in the search result of the user search query.

Using the records from application search bundle 340, application indexer 330 may build or add a record in search database 380, which may include metadata of the content associated with the record. In some embodiments, search database 380 includes multiple databases synchronized with each other. For example, search database 380 may include a first database to store indexed content and a second database to store records of the indexed content. More details of one embodiment of a search database are discussed below.

When a user submits a user search query, search daemon 320 may access search database 380 to find records that match the user search query. Note that search daemon 320 may search records associated with application data of third party application 310 without launching third party application 310. Search daemon 320 may present parts of the records matching the user search query, such as, for example, by displaying titles and sub-titles of the matching records in a search result region within a window. In some embodiments, the user may select a record from the matching records. In response to the user's selection, search daemon 320 may launch third party application 310 on the multifunctional device to present the content associated with the record selected. For instance, the content may include video data and third party application 310 may be launched to play the video; or the content may include an electronic book and third party application 310 may be launched to display the electronic book.

Figure 4:
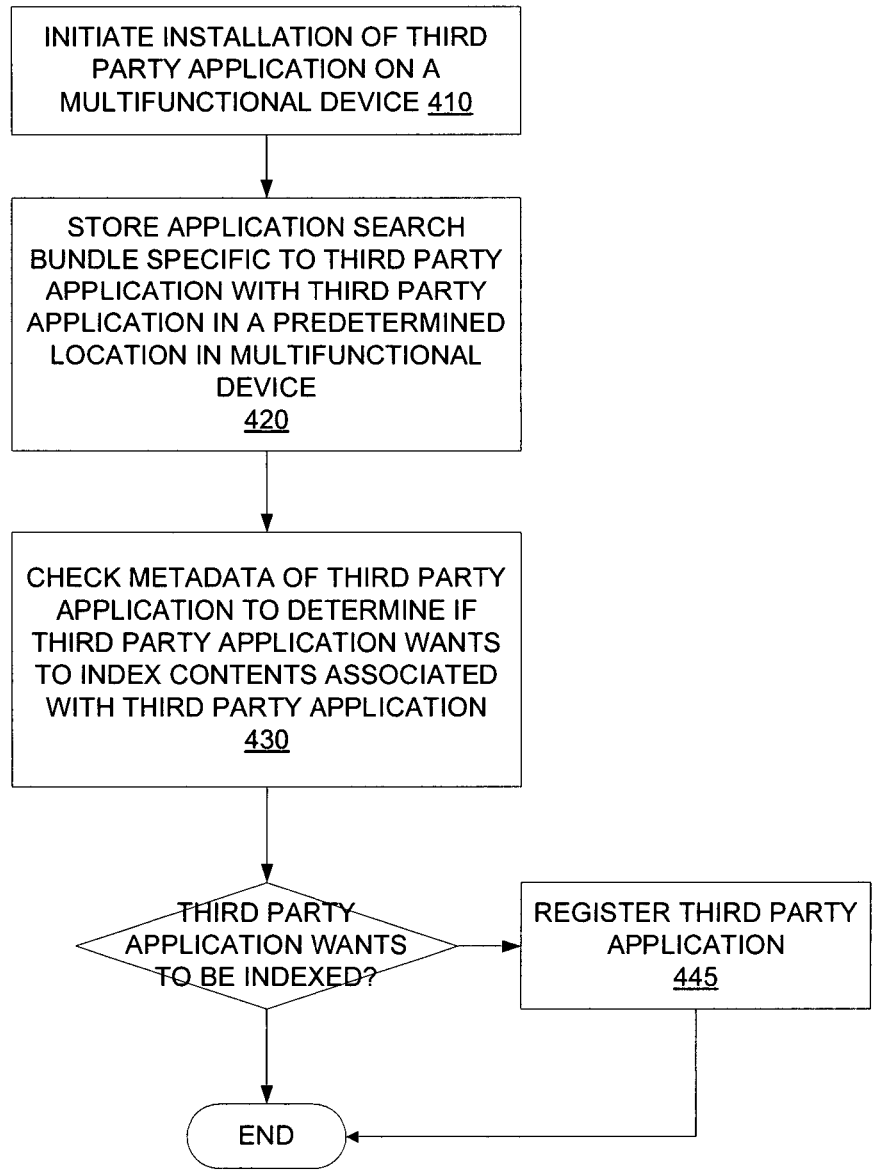
FIG. 4 is a flow chart of one embodiment of a method for setting up search and indexing capabilities for a third party application on a multifunctional device.

FIG. 4 is a flow chart of one embodiment of a method for setting up search and indexing capabilities for a third party application on a multifunctional device. The method may be performed by hardware, software, firmware, or a combination of any of the above.

In some embodiments, installation of a third party application is initiated on a multifunctional device at block 410. An application search bundle specific to the third party application is stored in a predetermined location with the third party application in the multifunctional device at block 420. Broadly speaking, the application search bundle is a plugin provided by the third party application. The application search bundle may be loaded to transfer records of content associated with the third party application. At block 430, metadata of the third party application is checked to determine if the third party application wants to index contents associated with the third party application. If the third party application wants to index contents, the third party application is registered at block 445. For example, a search daemon running on the multifunctional device may keep track of a list of registered applications in a centralized location and the search daemon may index contents associated with the third party application as discussed below.

FIG. 5 is a flow chart of one embodiment of a method for a third party application on a multifunctional device to process changes in application data. The method may be performed by hardware, software, firmware, or a combination of any of the above.

In some embodiments, a third party application is run on a multifunctional device at block 510. At block 520, the third party application changes records of application data associated with the third party application. At block 530, the third party application sends identifiers (IDs) of the changed records to a search daemon running on the multifunctional device.

FIG. 6 is a flow chart of one embodiment of a method for a search daemon on a multifunctional device to process changes in application data associated with a third party application. The method may be performed by hardware, software, firmware, or a combination of any of the above.

At block 610, a search daemon running on a multifunctional device receives IDs of changed records of application data associated with a third party application. The search daemon puts the IDs received into an update list at block 620. The search daemon may use the update list later to determine if it has to index records as discussed below.

FIG. 7 is a flow chart of one embodiment of a method for a search daemon on a multifunctional device to index application data. The method may be performed by hardware, software, firmware, or a combination of any of the above.

At block 710, the search daemon checks an update list to determine if there is any record changed. In some embodiments, the search daemon may check the update list periodically. If there is, then the search daemon has to index the changed record. The search daemon may launch an application indexer in a separate process to index the changed record at block 720.

FIG. 8 is a flow chart of one embodiment of a method for an application indexer on a multifunctional device to index application data. The method may be performed by hardware, software, firmware, or a combination of any of the above.

At block 810, an application indexer running on a multifunctional device instantiates an instance of an application search bundle in a separate process isolated from other third party applications, system applications, and search bundles. The application search bundle is a plugin specific to a third party application installed on the multifunctional device. At block 820, application indexer passes IDs of changed records to application search bundle to request the changed records from application search bundle. Alternatively, application indexer may decide to index all records associated with the third party application, and thus, requesting all records associated with the third party application from application search bundle.

At block 830, application indexer receives the records requested from the application search bundle. Each record may contain a set of attributes of content associated with the record, such as title of content, sub-title of content, and local identifier of content used by the third party application. At block 840, application indexer indexes records received and stores the records indexed in a search database within the multifunctional device.

Figure 9:
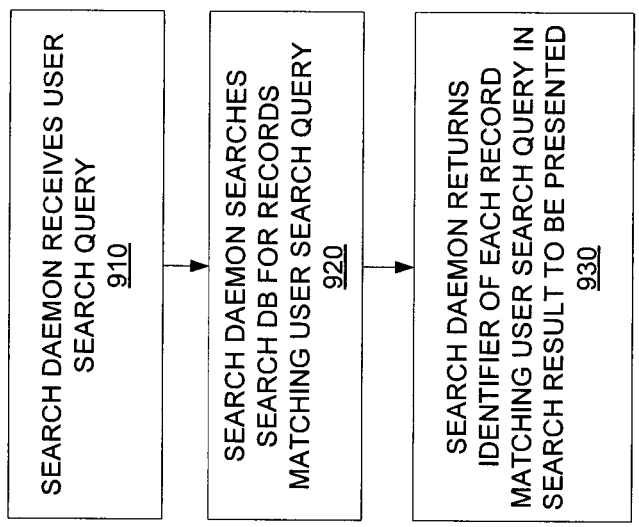
FIG. 9 is a flow chart of one embodiment of a method for a search daemon to search indexed application data associated with a third party application.

FIG. 9 is a flow chart of one embodiment of a method for a search daemon to search indexed application data associated with a third party application. The method may be performed by hardware, software, firmware, or a combination of any of the above.

At block 910, a search daemon receives a user search query. For example, a user may submit a user search query to look for records with a title having a specific text string (e.g., "spring"). At block 920, search daemon searches a search database containing indexed records for records that match the user search query.

At block 930, search daemon returns an identifier of each record matching the user search query in a search result to be presented to the user. In some embodiments, the identifier includes a title, a sub-title, a reference to the associated third party application, a local identifier (specific to the third party application), and a category.

In some embodiments, the owner of a search box in which the user search query is entered receives the search results from the search daemon at query-time. The user may select a record from the search result. The owner may be a search application, or the third party application. If the owner is a search application that performs global searches, the search application may launch the third party application and pass in the local identifier and category from the search daemon. If the owner is the third party application, it can simply present the content associated with the selected record. Note that when the owner is the third party application, only records in the search result relevant to the third party application may be shown.

Figure 10:
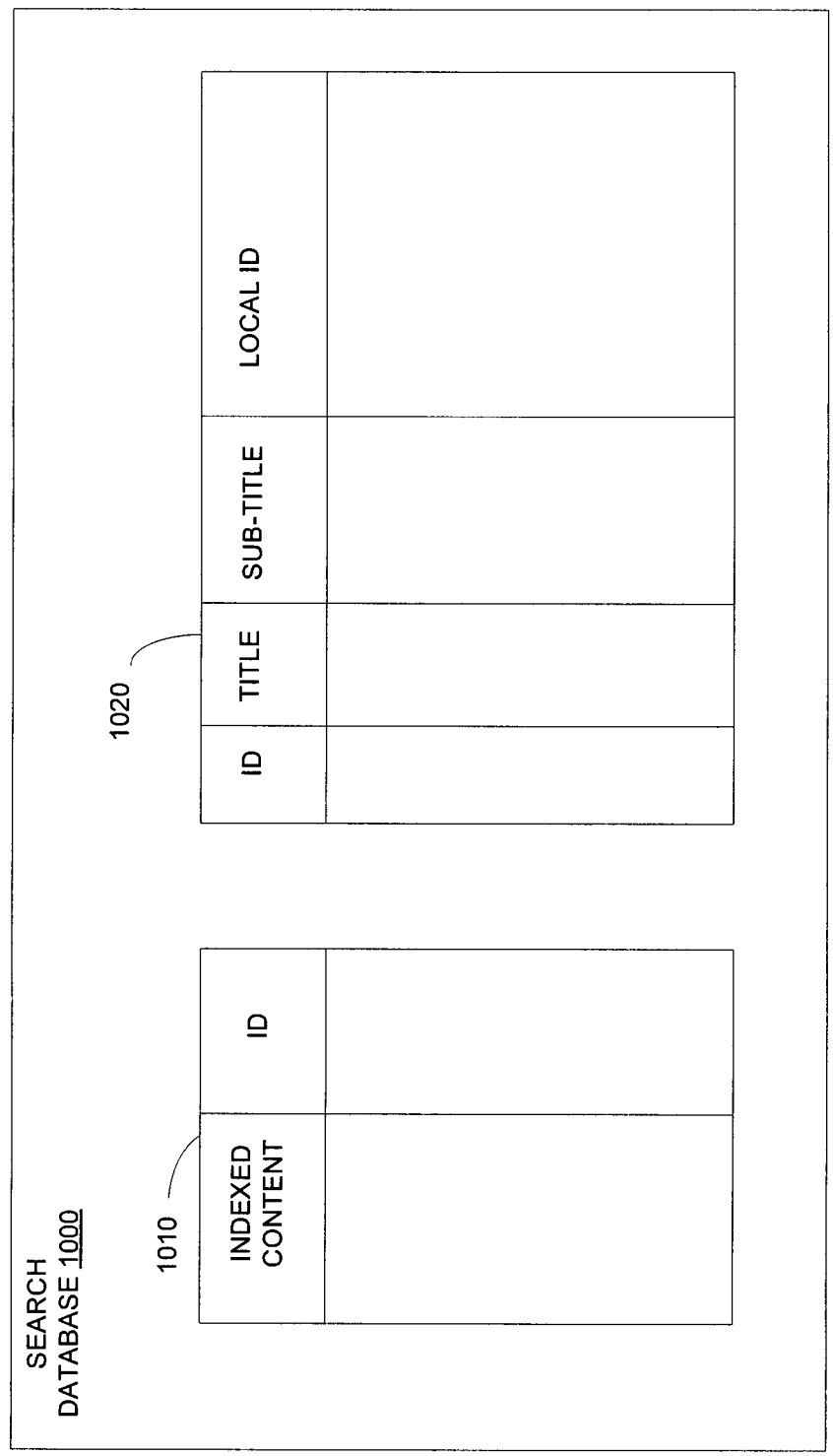
FIG. 10 illustrates one embodiment of a search database on a multifunctional device.

FIG. 10 illustrates one embodiment of a search database 1000 on a multifunctional device. The search database 1000 includes a first database 1010 and a second database 1020. In other embodiments, the search database 1000 may include more than two databases.

In some embodiments, the first database 1010 stores content (e.g., a document, a web page, an electronic book, a video, etc.) associated with some third party applications and their respective Ds. The second database 1020 may store records of the content. In the current example, each record includes the ID of the content, a title of the content, a sub-title of the content, and a local ID of the content. The local ID is used by a third party application in accessing and processing the content. Thus, the local ID may also be referred to as an application ID. Details of one embodiment of a local ID are shown in FIG. 11. The content in the search database 1000 is organized by indexing the records. A search daemon running on the multifunctional device may index the records and search the search database 1000 in response to user search queries as discussed above.

In some embodiments, the search database 1000 stores content of all categories (e.g., music, video, electronic books, podcasts, etc.) on the multifunctional device. Although search performed in the search database 1000 may be fast, the search database 1000 may become too large to backup. As such, the search database 1000 may have to be rebuilt from scratch if needed.

Alternatively, there is one search database for each category of content on the multifunctional device. For example, a first search database may be established for music, a second search database may be established for podcasts, a third search database may be established for electronic books, a fourth search database for a first third party application, and a fifth search database for a second third party application, and so on. By separating contents of different categories into different search databases, the search databases may be backed up at different frequencies depending on how stable the content in each search database is. The more stable the content is, the less frequent the corresponding search database has to be backed up. However, search of content in the search databases may be slowed down because of multiple search databases. To mitigate the impact on performance, a cache may be implemented in the multifunctional device to store records of frequently accessed content. As such, searches may become faster.

FIG. 11 illustrates one embodiment of an ID of an exemplary document. The ID 1100 includes a title 1110 of the exemplary document, a sub-title 1120 of the exemplary document, a third party application 1130 associated with the exemplary document, a category identifier 1140 of the exemplary document, and a application-specific ID 1150 of the exemplary document.

In some embodiments, the ID 1100 is unique only to a particular category within the third party application. A category is the type of content, such as slide, video, document, podcast, etc. Thus, the application-specific ID 1150 is unique per-category, and each category is unique within the third party application.

In some embodiments, a third party application may be associated with contents of multiple categories. For example, a third party application may be associated with a document in which a video and a podcast are embedded. The third party application may put such a document under a single category (e.g., Documents) as far as the search daemon is concerned. If the third party application wishes to be able to return a finer granularity of result, for example, just the podcast part of the document, it could provide an ID that points directly to the podcast and index it in a Podcasts category. The third party application could choose to submit either of these, or both, for indexing. The search daemon may not differentiate between a result with sub-pieces and a single atomic result.

Figure 12:
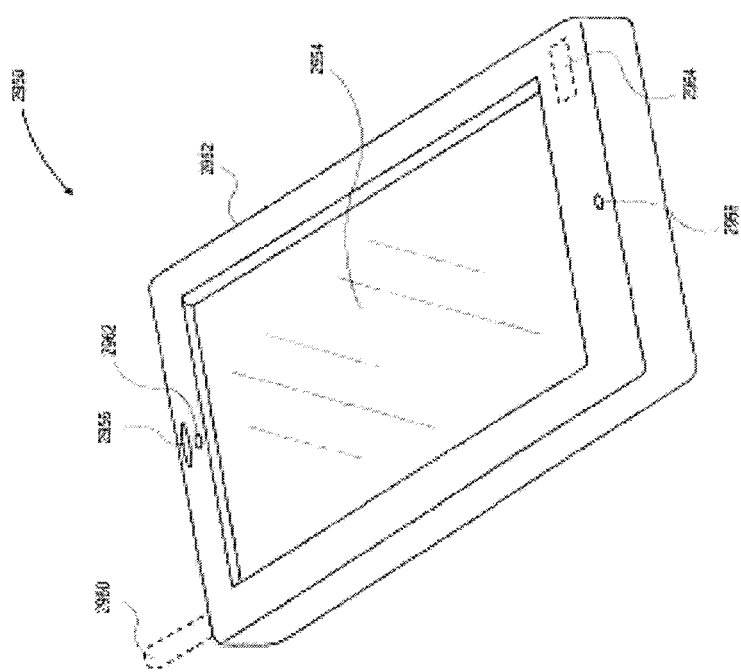
FIG. 12 is a perspective view of a device in accordance with one embodiment of the present disclosure.
Figure 13:
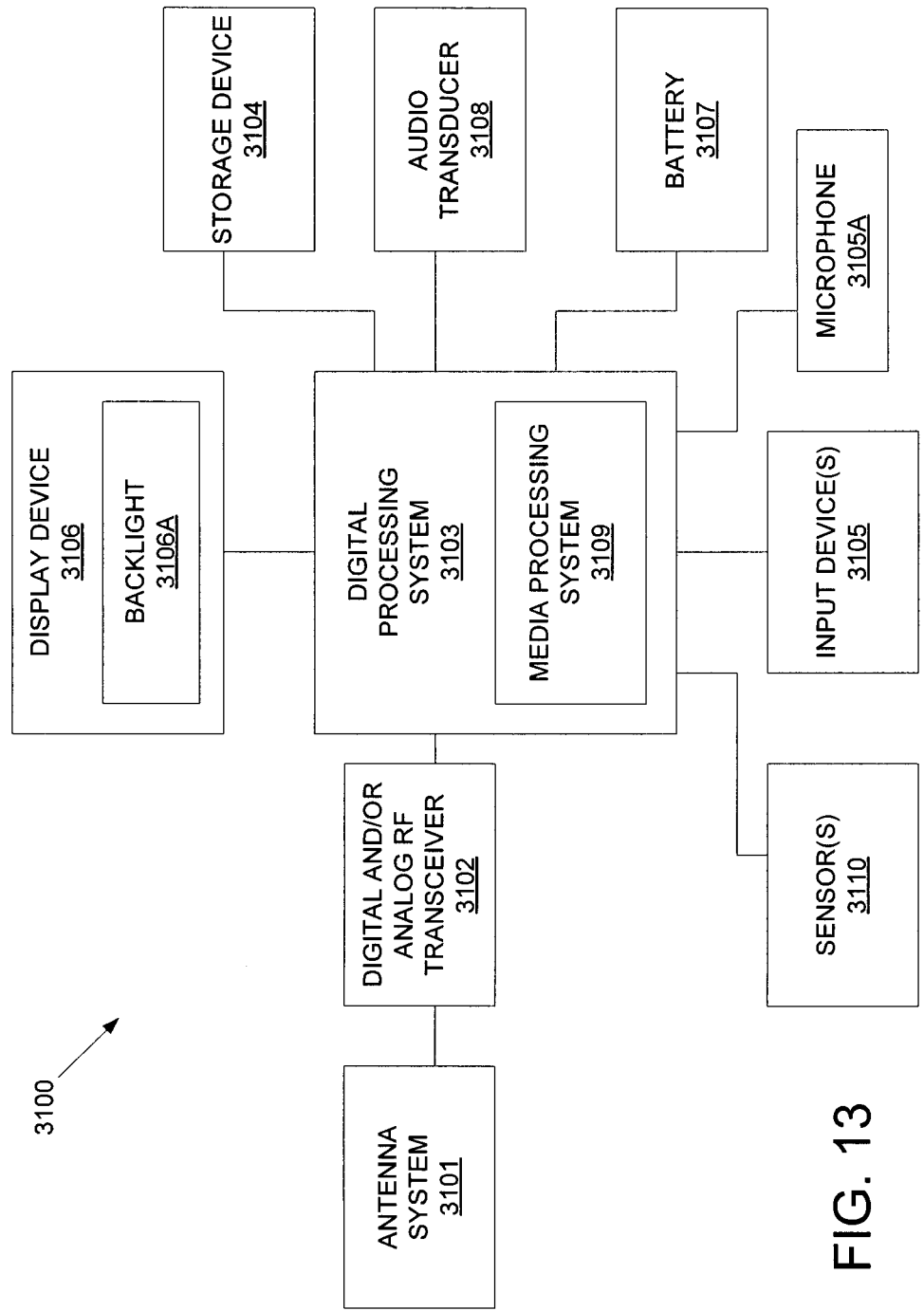
FIG. 13 shows an embodiment of a wireless device which includes the capability for wireless communication.
Figure 14:
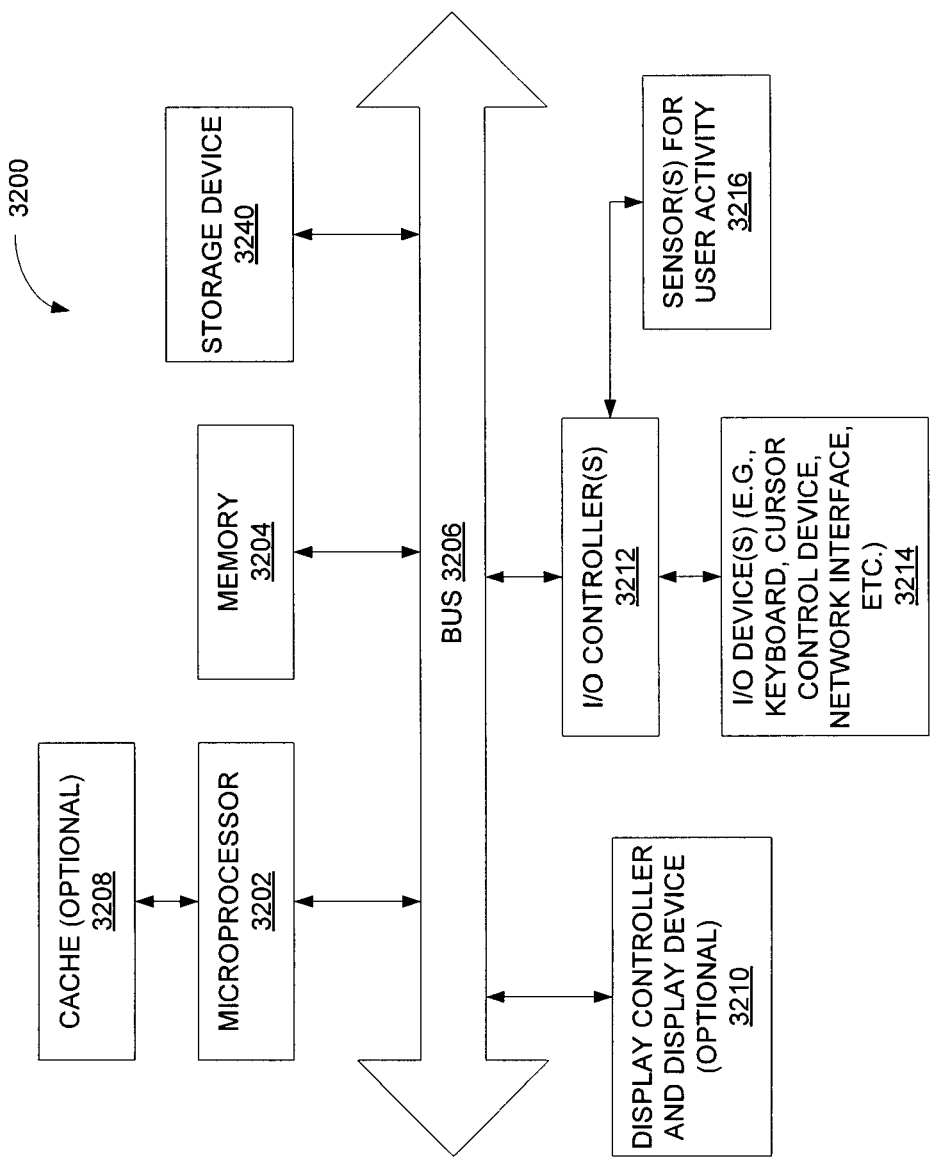
FIG. 14 shows another example of a device in accordance with one embodiment of the present disclosure.

In some embodiments, the methods, systems, and apparatuses of the present disclosure can be implemented in various devices including electronic devices, consumer devices, data processing devices, desktop computers, portable computers, wireless devices, cellular devices, tablet devices, handheld devices, multi touch devices, multi touch data processing devices, any combination of these devices, or other like devices. FIGS. 12-14 illustrate examples of a few of these devices.

FIG. 12 shows a device 2950 in accordance with one embodiment of the disclosure. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and an accelerometer 2964. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer, an iPhone®, and an iPod® are portable devices.

In certain embodiments of the present disclosure, the device 2950 can be used to implement at least some of the methods discussed in the present disclosure.

FIG. 13 shows an embodiment of a wireless device, which includes the capability for wireless communication. Wireless device 3100 may include an antenna system 3101. Wireless device 3100 may also include a digital and/or analog radio frequency (RF) transceiver 3102, coupled to the antenna system 3101, to transmit and/or receive voice, digital data and/or media signals through antenna system 3101.

Wireless device 3100 may also include a digital processing system 3103 to control the digital RF transceiver and to manage the voice, digital data and/or media signals. Digital processing system 3103 may be a general purpose processing device, such as a microprocessor or controller for example. Digital processing system 3103 may also be a special purpose processing device, such as an ASIC (application specific integrated circuit), FPGA (field-programmable gate array) or DSP (digital signal processor). Digital processing system 3103 may also include other devices, as are known in the art, to interface with other components of wireless device 3100. For example, digital processing system 3103 may include analog-to-digital and digital-to-analog converters to interface with other components of wireless device 3100. Digital processing system 3103 may include a media processing system 3109, which may also include a general purpose or special-purpose processing device to manage media, such as files of audio data.

Wireless device 3100 may also include a storage device 3104, coupled to the digital processing system, to store data and/or operating programs for the Wireless device 3100. Storage device 3104 may be, for example, any type of solid-state or magnetic memory device. Storage device 3104 may be or include a machine-readable medium.

Wireless device 3100 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3100 may also include at least one display device 3106, coupled to the digital processing system 3103, to display information such as messages, telephone call information, contact information, pictures, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the Wireless device 3100 may include multiple displays.

Wireless device 3100 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106. Battery 3107 may be, for example, a rechargeable or non-rechargeable lithium or nickel metal hydride battery. Wireless device 3100 may also include audio transducers 3108, which may include one or more speakers, and at least one microphone 3105A. In certain embodiments of the present disclosure, the wireless device 3100 can be used to implement at least some of the methods discussed in the present disclosure.

FIG. 14 shows another example of a device according to an embodiment of the disclosure. This device 3200 may include a processor, such as microprocessor 3202, and a memory 3204, which are coupled to each other through a bus 3206. The device 3200 may optionally include a cache 3208, which is coupled to the microprocessor 3202. The device may optionally include a storage device 3240 which may be, for example, any type of solid-state or magnetic memory device. Storage device 3240 may be or include a machine-readable medium.

This device may also optionally include a display controller and display device 3210, which is coupled to the other components through the bus 3206. One or more input/output controllers 3212 are also coupled to the bus 3206 to provide an interface for input/output devices 3214 and to provide an interface for one or more sensors 3216 which are for sensing user activity. The bus 3206 may include one or more buses connected to each other through various bridges, controllers, and/or adapters as are well known in the art. The input/output devices 3214 may include a keypad or keyboard or a cursor control device such as a touch input panel. Furthermore, the input/output devices 3214 may include a network interface, which is either for a wired network or a wireless network (e.g. an RF transceiver). The sensors 3216 may be any one of the sensors described herein including, for example, a proximity sensor or an ambient light sensor. In at least certain implementations of the device 3200, the microprocessor 3202 may receive data from one or more sensors 3216 and may perform the analysis of that data in the manner described herein.

In certain embodiments of the present disclosure, the device 3200 can be used to implement at least some of the methods discussed in the present disclosure.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable storage medium that provides instructions that, when executed by a processor, will cause the processor to generate an application programming interface (API) that allows an API-implementing component to perform operations, the operations comprising:

launching an application indexer to run in a process having privileges identical to privileges of a third party application executable on the processor, wherein the process is separate from other processes involving other third party applications executable on the processor;

instantiating, by the application indexer, an instance of an application search bundle to execute on the processor, the instance executing with reading and writing privileges identical to reading and writing privileges of the third party application, the third party application providing the application search bundle specific to the third party application to access records in an application data store associated with the third party application; and requesting, by the application indexer from the instance of the application search bundle, records identified by identifications passed to the instance of the application search bundle by the application indexer, wherein the instance of the application search bundle retrieves the identified records from the application data store without launching the third party application, the application indexer indexing the identified records received from the instance of the application search bundle in a search database.

2. The non-transitory machine-readable storage medium of claim 1, wherein the other processes include search and index processes of the other third party applications.

3. The non-transitory machine-readable storage medium of claim 1, wherein the operations further comprise:

the application indexer passing updated identifications in an update list to the application search bundle to request the corresponding records, wherein the updated identifications are added into the update list when the third party application provides the updated identifications in response to changing the corresponding records.

4. A computer-implemented method, comprising:

installing a third party application on a computing device, the third party application providing a search plugin specific to the third party application to access records in an application data store associated with the third party application;

checking metadata of the third party application to determine existence of metadata indicating the third party application wants to index records in the application data store associated with the third party application;

registering the third party application in response to determining the metadata indicating the third party application wants to index the records in the application data store associated with the third party application exists; and instantiating, by a search daemon specific to the third party application and running on the computing device, an instance of the search plugin to execute in a separate process that executes with reading and writing privileges identical to reading and writing privileges of the third party application, the search daemon to request a record associated with the third party application from the instance of the search plugin by passing an identification for the record to the instance of the search plugin, and to receive the identified record from the instance of the search plugin in response to the instance of the search plug-in receiving the identifier, wherein the instance of the search plugin retrieves the identified record from the application data store without launching the third party application.

5. The method of chair 4, further comprising:

launching the third party application in response to a user request, wherein the third party application changes a record and sends a corresponding identification of the changed record to the search daemon to be stored in an update list in response to the change, the update list usable by the search daemon to index the changed record.

6. The method of claim 4, wherein the search plugin is invoked after the third party application has been terminated.

7. The method of claim 4, further comprising:

providing to the separate process privileges identical to privileges entitled to by the third party application.

8. A computer-implemented method, comprising:

a third party application, executable on a data processing device, specifying a set of attributes of a record to be presented when the record becomes part of a search result of a search performed by a search daemon specific to the third party application in response to a user search query; and the third party application providing an application search bundle specific to the third party application to access records in an application data store associated with the third party application, an instance of the application search bundle being instantiated by the search daemon to execute with reading and writing privileges identical to reading and writing privileges of the third party application, wherein a search indexer, instantiated by the search daemon to index the records, requests the records from the instance of the application search bundle by passing identifiers for the records to the instance of the application search bundle, and receives the records from the instance of the application search bundle, the records passed by the instance of the application search bundle in response to receiving the identifications, and wherein the instance of the application search bundle retrieves the records from the application data store without launching the third party application.

9. The method of claim 8, further comprising:

the third party application changing records associated with the third party application; and storing corresponding identifiers of the records changed in a list accessible by the search indexer.

10. The method of claim 9, wherein the search indexer retrieves the identifiers from the list after the third party application has terminated and uses the identifiers to obtain the records changed from the instance of the application search bundle.

11. An apparatus comprising:

an application indexer, executable on a data processing device, to run in a process having privileges identical to privileges of a third party application executable on the data processing device, wherein the process is separate from other processes involving other third party applications executable on the data processing device; and a search database stored on a data storage device coupled to the data processing device, wherein the application indexer is operable to instantiate an instance of an application search bundle to execute with reading and writing privileges identical to reading and writing privileges of the third party application, the third party application to provide the search application bundle specific to the third party application to access the records in an application data store associated with the third party application, and wherein the application indexer is further operable to index records in the search database received from the instance of the application search bundle in response to a request received by the instance of the application search bundle from the application indexer for the records, the request passing identifications for the records to the instance of the application search bundle, wherein the instance of the application search bundle retrieves the identified records from the application data store without launching the third party application.

12. The apparatus or claim 11, wherein another application indexer is executable on the data processing system in another process having privileges identical to privileges of another third party application executable on the data processing system.

13. The apparatus of claim 11, wherein the application indexer is operable to pass updated identifications associated with the records in an update list to the application search bundle to request the records, wherein the updated identifications are added into the update list when the third party application provides the updated identifications in response to changing the corresponding records.

14. The apparatus of claim 11, further comprising:
a display device to display a graphical user interface to receive a search query from a user; and
a search daemon, executable on the data processing device, to search the indexed records in the search database for records matching the search query without invoking the third party application.

15. The apparatus of claim 14, wherein the graphical user interface presents the records matching the search query and allows the user to select a record from the records matching the search query, and in response to the user selecting the record, the data processing device is operable to launch the third party application to present the record selected by the user.

* * * * *